J. R. PALMENBERG.
FRAME FOR LADIES' DRESSES.
894. Reissued Feb. 7, 1860.
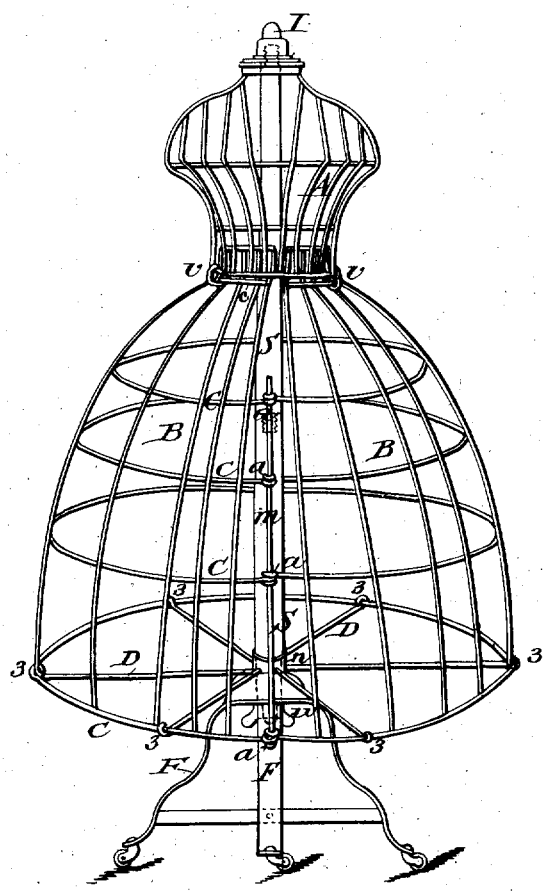

UNITED STATES PATENT OFFICE.

JOSEPH R. PALMENBERG, OF NEW YORK, N. Y.

IMPROVED FRAME FOR LADIES' DRESSES.

Specification forming part of Letters Patent No. 26,781, dated January 10, 1860; Reissue No. 894, dated February 7, 1860.

*To all whom it may concern:*

Be it known that I, JOSEPH R. PALMENBERG, of New York, in the county and State of New York, have invented a new and Improved Lady's Figure and Stand; and I hereby declare that the following is an exact and full description of the same, reference being had to the accompanying drawings, and to the letters of reference marked thereon.

The nature of my invention consists in constructing ladies' figures and stands in such a manner that the whole may be readily taken apart, when required to be packed in a box, so that the same may occupy less room, and thereby save expense on the same in transportation.

The upper part or body of the figure A, down to the waist, is made in one piece. The lower part, B, is made in two pieces, divided in the center at front and back. This lower part may be likewise made in more pieces, or may be divided at the sides. The circular-rings or wires *c c c*, &c., to which the wires running from top to bottom are fastened, are provided on their ends, where they join the other part, with holes *a a*, &c., through which, when the figure is put together, rods *m* pass, which said rods fasten the parts together. The diagonal braces D at the bottom, which strengthen the figure, are fastened to a ring, *n*, which passes around the upright stand S, and the extreme ends 3 of the braces are bent round the lower circular ring, C, and by this means firmly attached to the same after the parts forming the lower part of the figure have been joined together through the rods *m*, as above described. The upper ends of the parts B are made so small as to fit into the waist part of the body A, which latter holds thereby those lower parts together, and is then fastened by means of hinges or catches *v*, fast to the lower ring of the body A, and pass under the top ring, *c*, of the parts B. The stand S is likewise made in several parts, having the wooden standard made in two parts, screwed together near the center, and which is fastened to the feet F by means of a thumb-nut, *w*. On the top of the stand S a cap, I, is screwed on, which fastens the figure to the stand when put together. The feet F are made in two parts and bent out of flat metal in the proper shape, so that each part shall form two legs, which are put together at right angles to each other and fastened to the stand S by means of the screw-nut *w*.

By this arrangement the whole figure, stand, and feet can be taken apart and occupy when packed only one sized part of the space as when packed, completely put together, or in one piece, where the freight of transportation amounts in many cases to more than the price of the whole figure. A box twenty-eight by twenty-eight by forty, which will take at present only one figure, will take conveniently nearly seven figures constructed on my improved plan, while one figure as above described will only require a box of twenty-four by twenty-two by sixteen inches.

I do not claim ladies' figures made of wire and fixed on a stand, as this has been before known and used; but

What I claim as my invention, and desire to secure by Letters Patent, is—

1. The arrangement and construction of ladies' figures in parts and the manner of fastening the separate parts together, substantially as described, and for the purpose specified.

2. The arrangement and construction of the stand and feet for ladies' figures, made in parts, in the manner described, and for the purpose substantially as set forth.

JOSEPH R. PALMENBERG.

Witnesses:

HENRY E. RAEDER,
JAMES H. DAVIDSON.